United States Patent [19]
Schwellenbach

[11] 3,843,158

[45] Oct. 22, 1974

[54] TRAILER COUPLING WITH PASSAGEWAY

[76] Inventor: Robert D. Schwellenbach, Box 246, Pierre, S. Dak. 57501

[22] Filed: Dec. 20, 1972

[21] Appl. No.: 316,685

[52] U.S. Cl................. 280/403, 105/8, 105/199 C, 280/420, 296/23 MC, 280/423 R
[51] Int. Cl............................................. B60d 5/00
[58] Field of Search........ 280/403, 421, 423 R, 420; 296/23 MC; 105/8, 199 C

[56] References Cited
UNITED STATES PATENTS

| 1,980,613 | 11/1934 | Curtiss................................ 280/403 |
| 2,107,881 | 2/1938 | Beardsley............................ 280/403 |
| 2,667,365 | 1/1954 | Hollifield......................... 280/421 X |
| 3,127,194 | 3/1964 | Jeffries.................................. 280/421 |
| 3,598,427 | 8/1971 | Lavery.................................. 280/421 |
| 3,637,251 | 1/1972 | Plant................................. 296/23 R |
| 3,692,332 | 5/1970 | Pappatheodorn................ 280/423 R |

*Primary Examiner*—Leo Friaglia
*Attorney, Agent, or Firm*—Clarence O'Brien; Harvey B. Jacobson

[57] ABSTRACT

A fifth wheel type coupling for pivotal connection between towing and trailing vehicles including openings lying along the pivotal axis defining a passageway extending through the coupling, whereby persons, articles, and the like may move between the vehicles regardless of their relative angular positions.

10 Claims, 5 Drawing Figures

PATENTED OCT 22 1974

TRAILER COUPLING WITH PASSAGEWAY

The present invention is generally related to trailer hitches or couplings and, more particularly, to a fifth wheel type coupling for pivotal connection between towing and trailer vehicles.

In recent years, there has been a substantial increase in the number of mobile homes, campers, and other trailers which are adapted for towing by pickup trucks. Various hitches and couplings have been provided for the purposes of interconnecting the towing and trailer vehicles in a manner which affords safe, dependable vehicle operation. Due to cornering and other maneuvers, it is essential that such couplings be pivotal in nature to permit angular movement between the two vehicles. Heretofore, it has been necessary that the vehicles be at a standstill in order for passengers to move from the towing vehicle to the trailer, or vice versa. This often imposes a great inconvenience to passengers and driver alike, it being impractical, if not impossible to stop safely along most highways, to permit the passengers to move between the vehicles. Therefore, it would be desirable to provide a means of allowing passengers to move freely between the trailer and towing vehicle while they are in motion, making it unnecessary to come to a stop. Such a means would include a passageway between the trailer and towing vehicles, sufficiently large enough to allow individuals to move between vehicles with ease while they are in motion.

Therefore, it is an object of the present invention to provide a novel trailer coupling for operatively connecting trailer and towing vehicles together in a manner which permits individuals to move between the two vehicles.

Another object of the present invention is to provide a unique trailer coupling for pivotally connecting trailer and towing vehicles and provide a means of communication therebetween, whereby individuals may safely move between the two vehicles, even when they are in motion.

It is a further object of the present invention to provide a versatile "fifth wheel" type coupling including a central, axial opening which defines a passageway of sufficient dimension to allow individuals, articles, or the like to pass therethrough, regardless of the relative angular positions of the towing and trailer vehicles.

Still another object of the present invention is to provide a novel trailer coupling which is comprised of a relatively small number of moving parts, is durable, long lasting, economical to manufacture, and relatively easy to mount between existing trailers and towing vehicles.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
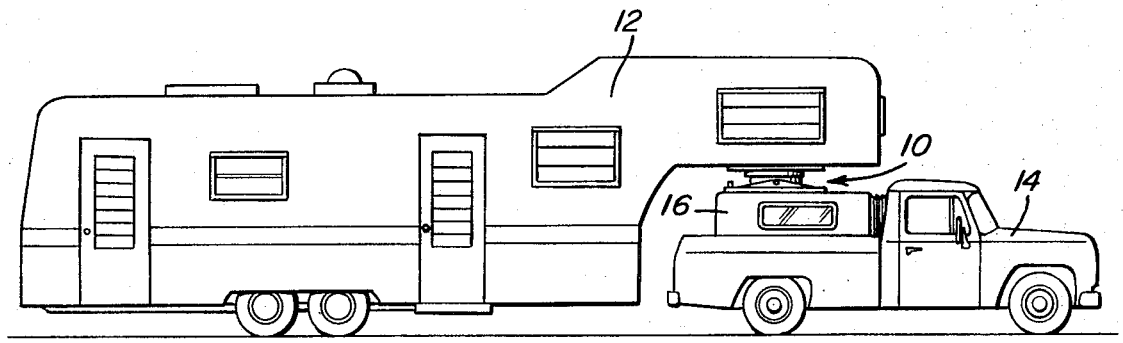
FIG. 1 is an elevational view of a typical trailer and towing vehicle combination with the coupling of the present invention mounted therebetween.
Figure 2:
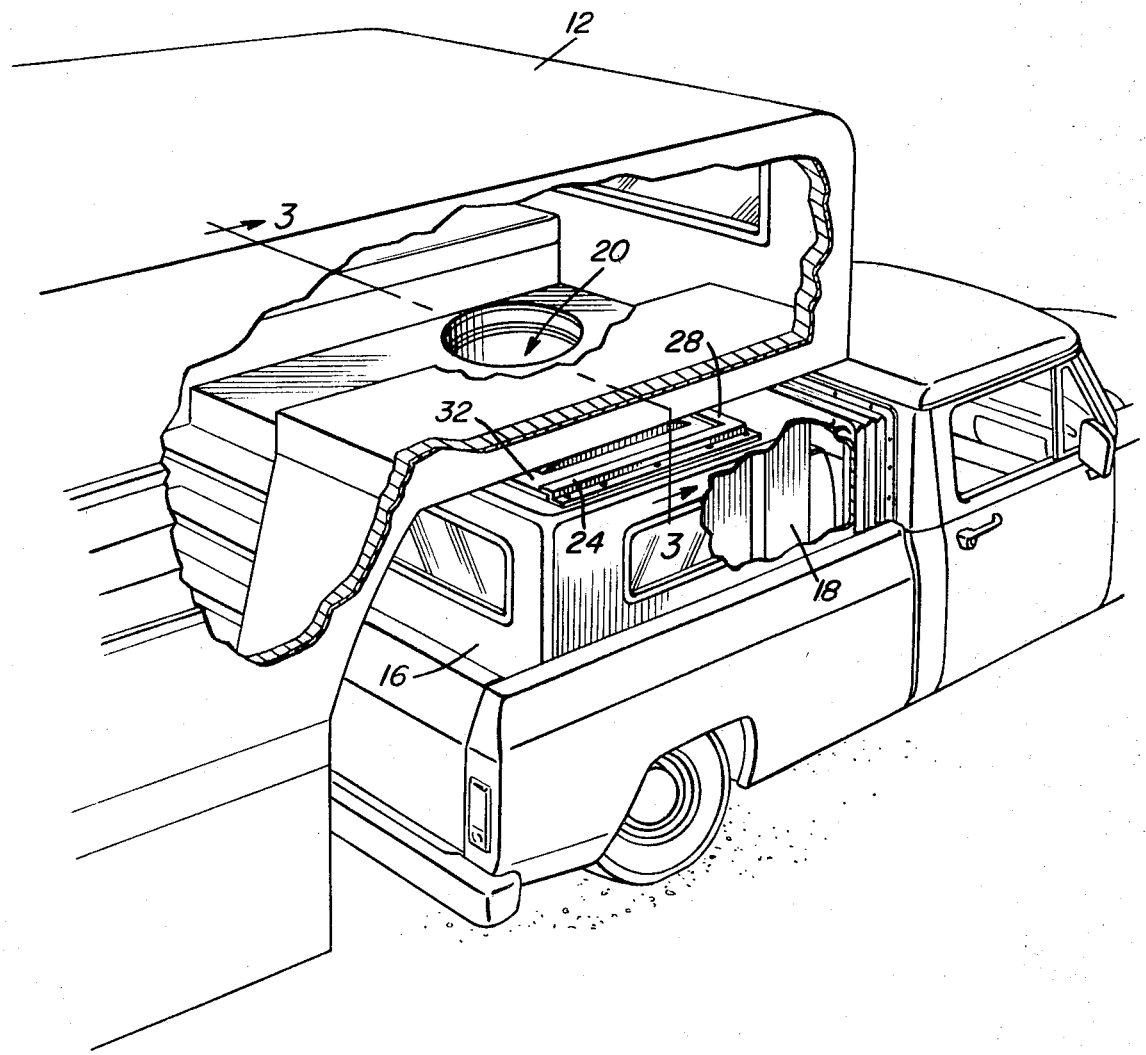
FIG. 2 is a partial perspective view with sections removed of the trailer and towing vehicles illustrated in FIG. 1.

Referring now, more particularly, to FIGS. 1 and 2 of the drawings, the coupling of the present invention is generally indicated by the numeral 10 and is illustrated as being mounted between a mobile home 12, and a pickup truck 14. Of course, it is not intended that the coupling be limited in its use to the vehicles illustrated, as the coupling may be used with various trailers and towing vehicles. The coupling is so constructed to provide a pivotal connection between the trailer and towing vehicles and is similar in operation to conventional "fifth wheel" assemblies.

Pickup truck 14 is provided with a camper or storage compartment 16 mounted over the truck bed and provided with appropriate reinforcement, not illustrated, to assure sufficient strength to pull the trailer through coupling 10. The pickup truck is further modified, as illustrated in FIG. 2, to include a doorway or opening 18 extending between the truck cab and compartment 16. Preferably, the doorway and compartment are of sufficient dimension to provide crawling or kneeling space for individuals therein. Coupling 10 is mounted to the top of compartment 16 and connected to a bottom surface at the front portion of trailer 12 to provide a passageway 20 communicating between the trailer and compartment 16. The passageway is of sufficient dimension to permit individuals to easily pass therethrough. It will be appreciated that the passageway lies along the pivotal axis of the coupling, such that the configuration of the passageway is unaffected by the angular relationship between the trailer and towing vehicles.

Figure 3:
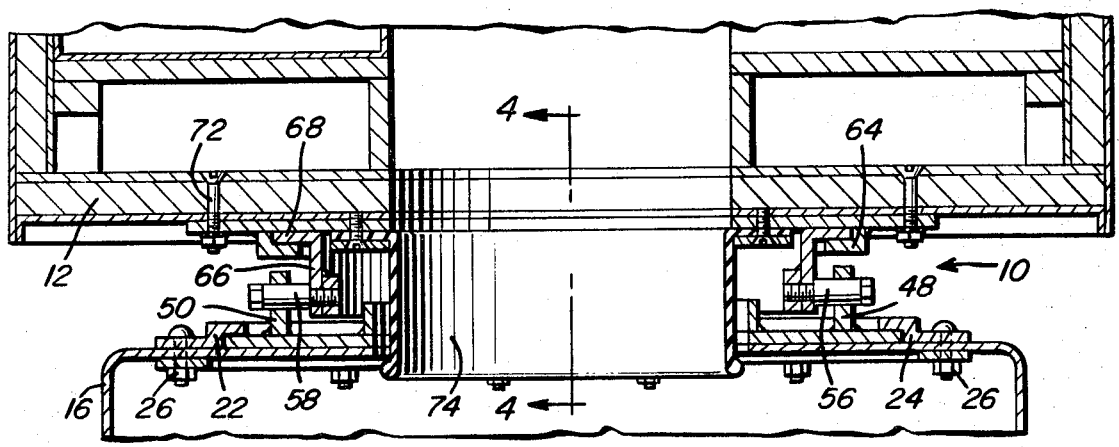
FIG. 3 is a sectional view of the coupling of the present invention taken along section 3—3 of FIG. 2.
Figure 4:
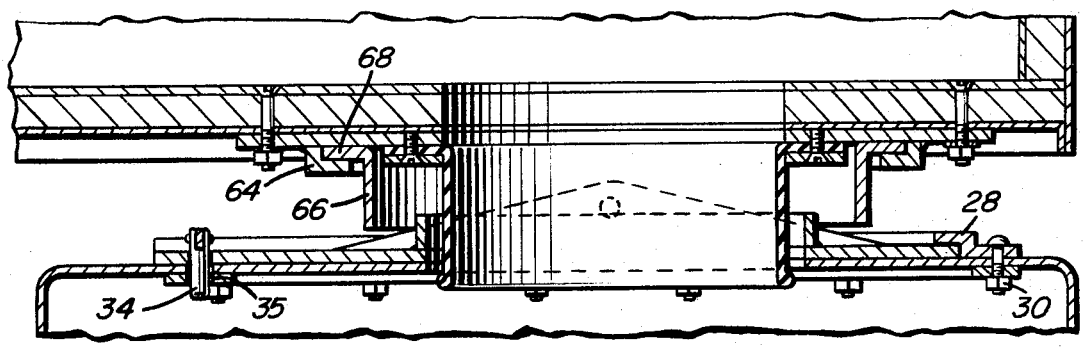
FIG. 4 is a sectional view taken along section 4-4 of FIG. 3.
Figure 5:
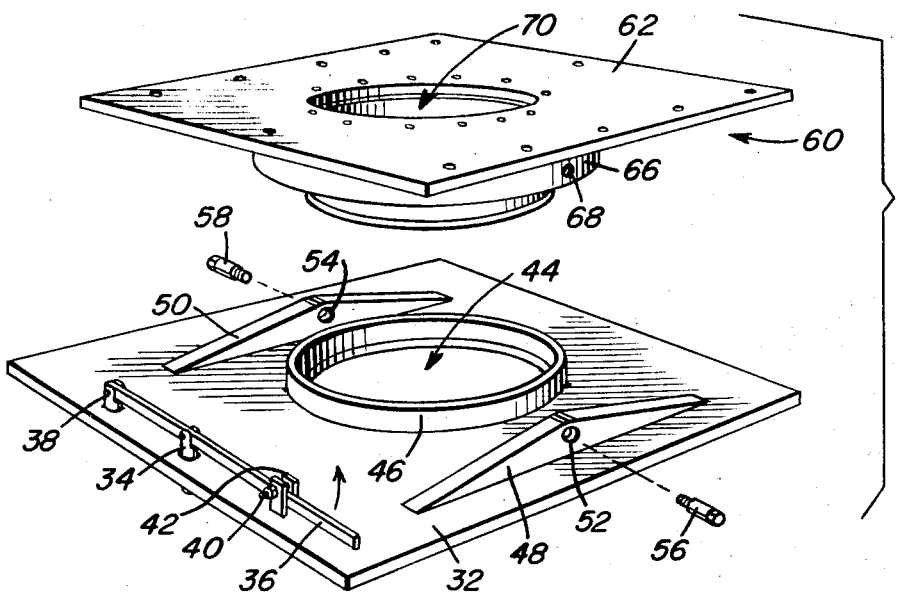
FIG. 5 is an exploded perspective view of the coupling of the present invention.

Referring now, more particularly, to FIGS. 3 and 5, the structure of the coupling of the present invention may be seen in more detail. A pair of rigid angle irons 22 and 24 are mounted in spaced parallel relation to each other on the top of compartment 16 by way of bolts 26, or similar fastening means. The angle irons extend forward along the top of the compartment and terminate at junctions with a third angle iron 28 which extends transversely across the compartment top and is also bolted thereto as indicated at 30. Together, angle irons 22, 24, and 28 define a U-shaped flange which opens toward the back end of compartment 16.

The coupling is provided with a lower mounting frame including a flat, rigid plate 32 which is slidably received by the U-shaped flange and held in position by way of a locking pin 34 which normally extends through an appropriate aperture 35 in the top of compartment 16. The locking pin is fastened to a lever 36 which is pivotally connected to plate 32 as indicated at 38. Preferably, lever 36 is held in the downward locked position by way of a bolt or cotter pin 40 which straddles the lever and engages a pair of tabs 42 integral with plate 32. It will be appreciated that plate 32 and the components carried thereby may be conveniently mounted to compartment 16 by merely sliding into the U-shaped flange defined by angle irons 22, 24, and 28, and locking such in position by way of lever 36 and associated pin 34.

Plate 32 is further provided with a circular central opening 44 with a cylindrical flange 46 extending therearound. A pair of rigid, upstanding members 48 and 50 are integral with plate 32 and are provided with a pair of aligned apertures 52 and 54 which rotatably receive pivot pins 56 and 58, respectively. Each of the pivot pins is threaded at one of its ends for fastening to a cylindrical member 66 associated with an upper mounting frame generally indicated by the numeral 60. The upper mounting frame is provided with a mounting plate 62 having a circular ring or collar 64 depending therefrom. Cylindrical member 66 is provided with a radially extending flange 68 at its upper end which is slidably received by collar 64 to provide a rotational connection therebetween. Diametrically opposite, threaded apertures 68 receive the threaded ends of shaft members 56 and 58 so as to provide a pivotal connection between the upper and lower mounting frames to permit pivotal movement about a substantially horizontal axis defined by the pivot pins.

Mounting plate 62 includes a central opening 70 which is generally aligned with opening 44 in plate 32 to define a passageway extending vertically through the coupling. Preferably, openings 44 and 70 are circular and concentric with ring 64 such that relative positions of the openings are substantially unchanged by changes in angular relation between the trailer and towing vehicles. Such angular changes are normally encountered when cornering the vehicles.

The upper mounting frame is fastened to the trailer by way of bolts 72 or similar fastening means. A cylindrical boot 74 is fastened to plate 62 in alignment with opening 70 and extends downwardly through opening 44 of the lower mounting frame. Preferably, the boot is made of rubber or other appropriate flexible, resilient material. The boot serves as a covering over the flanges, etc., to provide a relatively smooth wall in the passageway to avoid injury.

From the foregoing description, it will be appreciated that the coupling of the present invention provides a dual function in that it serves as a "fifth wheel" type connection between towing and trailing vehicles and as a passageway communicating the vehicles' interiors. This provides a convenient means of passage between the vehicles, even when in motion and in cornering maneuvers. In addition, the passageway permits the movement of air between the vehicles which may be utilized to enhance the vehicles' ventilation, heating, or cooling systems. Of course, it is not intended that the present invention be limited to the exact mounting and locking arrangement illustrated in the drawings. Other mountings, rotational and pivotal connections may be utilized, so long as a vertical passageway of appropriate dimension is provided between the trailer and towing vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with trailer and towing vehicles each having an interior for carrying passengers or the like, a coupling comprising a first mounting frame attached to said towing vehicle, a second mounting frame attached to said trailer vehicle, said second mounting frame being vertically spaced from said first mounting frame, pivot support means supporting said second frame from said first frame for pivotal movement about a generally vertical axis, and passageway means communicating the interior of said towing vehicle with the interior of said trailer vehicle for permitting passage of persons therebetween.

2. The structure set forth in claim 1 wherein said passageway means is defined by first and second openings in said first and second mounting frames respectively.

3. The structure set forth in claim 2 wherein said first and second openings are in general vertical alignment with each other and lie along said axis of pivotal movement.

4. The structure set forth in claim 3 wherein one of said mounting frames includes a circular collar member, the other of said mounting frames including a flange member in sliding engagement with said collar member.

5. The structure set forth in claim 4 wherein said other mounting frame includes pivotal fastening means supporting said flange member for pivotal movement thereof about a generally horizontal axis.

6. The combination of claim 1 wherein said pivot support means also includes means pivotally supporting said second frame from said first frame for pivotal movement about a generally horizontal axis.

7. The combination of claim 1 wherein said generally horizontal axis passes at least closely adjacent said generally vertical axis.

8. A coupling for towing a trailer vehicle, said coupling comprising an upper mounting frame adapted to be connected to the trailer vehicle, a lower mounting frame adapted to be connected to a towing vehicle and underlying said upper mounting frame, said upper and lower mounting frames including upper and lower openings, respectively, disposed in vertical registry with each other, said openings each being of a diameter adapted to receive a person's body therethrough and together defining a generally vertical passageway through said frames for movement of persons through the coupling, said upper and lower frames including coacting means pivotally mounting said upper frame from said lower frame for pivotal movement about a generally vertical axis generally centered relative to said passageway and for pivotal movement of said upper frame relative to said lower frame about a generally horizontal axis passing at least closely adjacent said generally vertical axis and intermediate the upper and lower ends of said passageway.

9. The structure set forth in claim 8 wherein each of said openings is of generally circular configuration, the shape of said passageway means being independent of the relative pivotal angular positions of said upper and lower mounting frames.

10. The structure set forth in claim 9 wherein said passageway is defined by a resilient, generally cylindrical member attached at one end to one of the mounting frames about the corresponding opening and having its other end projecting through the other opening.

* * * * *